United States Patent [19]

Young et al.

[11] Patent Number: 4,965,121

[45] Date of Patent: Oct. 23, 1990

[54] SOLAR CONTROL LAYERED COATING FOR GLASS WINDOWS

[75] Inventors: Paul I. Young, Walnut Creek; Jesse D. Wolfe, San Ramon, both of Calif.

[73] Assignee: The BOC Group, Inc., Murray Hill, N.J.

[21] Appl. No.: 239,590

[22] Filed: Sep. 1, 1988

[51] Int. Cl.⁵ .................... G02B 5/28; C23C 4/00; B32B 15/04

[52] U.S. Cl. .................... 428/213; 350/1.6; 350/1.7; 350/166; 428/212; 428/220; 428/426; 428/432; 428/689; 428/701

[58] Field of Search .............. 428/426, 432, 689, 701, 428/212, 213, 220; 350/1.6, 1.7, 164, 166

[56] References Cited

U.S. PATENT DOCUMENTS

| | | | |
|---|---|---|---|
| 3,682,528 | 8/1972 | Apfel | 350/166 |
| 3,978,272 | 8/1976 | Donley | 428/434 |
| 4,022,947 | 5/1977 | Grubb et al. | 428/432 |
| 4,327,967 | 5/1982 | Groth | 350/258 |
| 4,368,945 | 1/1983 | Fujimori et al. | 350/1.7 |
| 4,504,109 | 3/1985 | Taga et al. | 350/1.6 |
| 4,507,547 | 3/1985 | Taga et al. | 219/543 |
| 4,556,599 | 12/1985 | Sato et al. | 428/216 |
| 4,581,250 | 4/1986 | Taguchi et al. | 428/212 |
| 4,769,290 | 9/1988 | Heltich et al. | 428/432 |
| 4,786,783 | 11/1988 | Woodward | 219/547 |
| 4,799,745 | 1/1989 | Meyer | 350/1.7 |
| 4,859,532 | 8/1989 | Oyama et al. | 428/336 |

FOREIGN PATENT DOCUMENTS

| | | |
|---|---|---|
| 0137161 | 3/1985 | European Pat. Off. . |
| 0185314 | 6/1986 | European Pat. Off. . |
| 0219273 | 5/1987 | European Pat. Off. . |
| 63-134232 | 7/1988 | Japan . |
| 63-239044 | 7/1988 | Japan . |
| 63-239043 | 8/1988 | Japan . |
| 8801230 | 6/1988 | PCT Int'l Appl. . |
| 1307642 | 2/1973 | United Kingdom . |

OTHER PUBLICATIONS

Holland et al., "Heat Reflecting Windows Using Gold and Bismuth Oxide Films", *British Journal of Applied Physics*, vol. 9, No. 9, Sep. 1958, pp. 359–361.

*Primary Examiner*—Ellis P. Robinson
*Assistant Examiner*—Archene A. Turner
*Attorney, Agent, or Firm*—Robert I. Pearlman; David A. Draegert

[57] ABSTRACT

A five-layer coating, commonly called a "stack", for glass windows in order to control the proportion of solar radiation permitted to pass through the window, the remainder being reflected by the coating, while maintaining a desired visible light characteristic transmission. Particularly, the technique is applied to vehicle glass windows, such as truck and automobile windshields, where the amount of solar radiation allowed to pass into the vehicle through the window is minimized within the constraints of maintaining visible light transmission above a certain legal level. The characteristics of the coating are also selected for visible light reflected from the window to the outside to be a substantially neutral color, highly desirable for the overall appearance of trucks and automobiles.

15 Claims, 2 Drawing Sheets

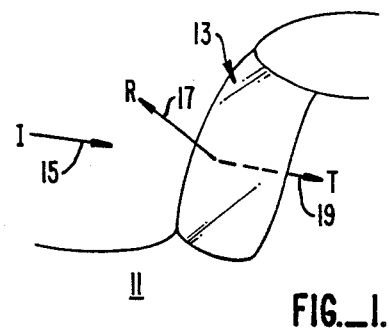
FIG._1.
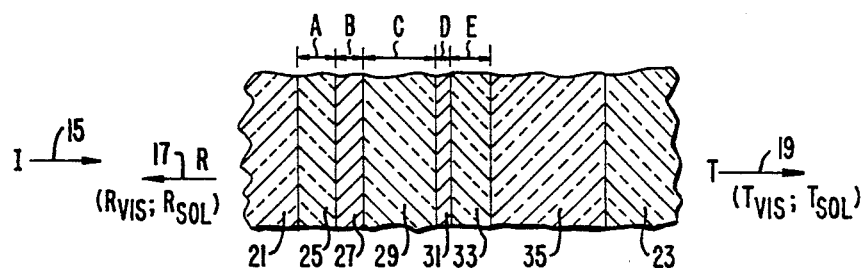
FIG._2.
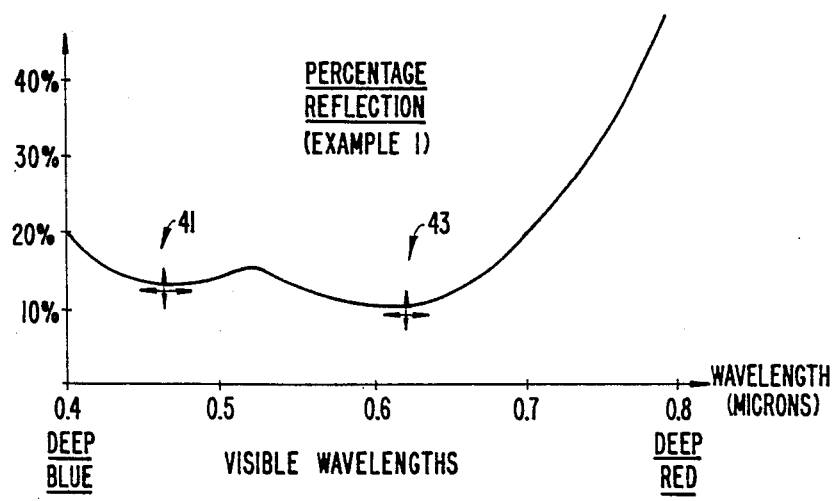
FIG._6.

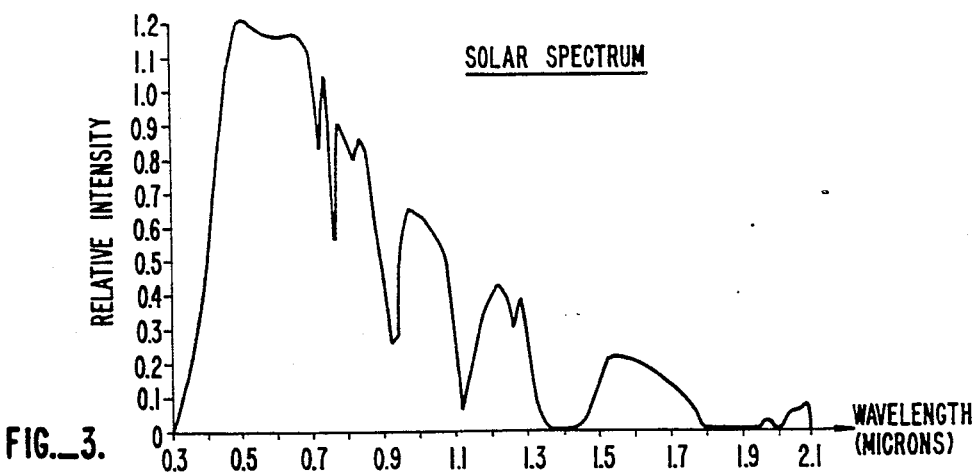
FIG._3.
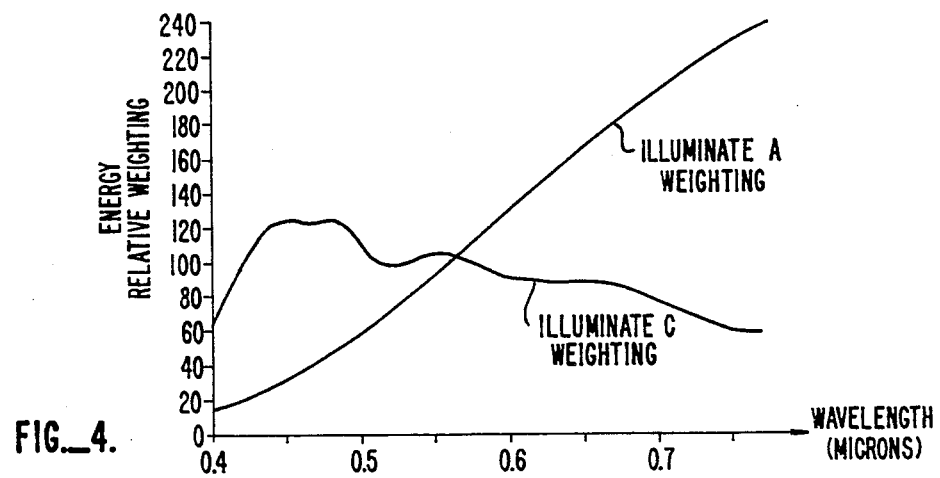
FIG._4.
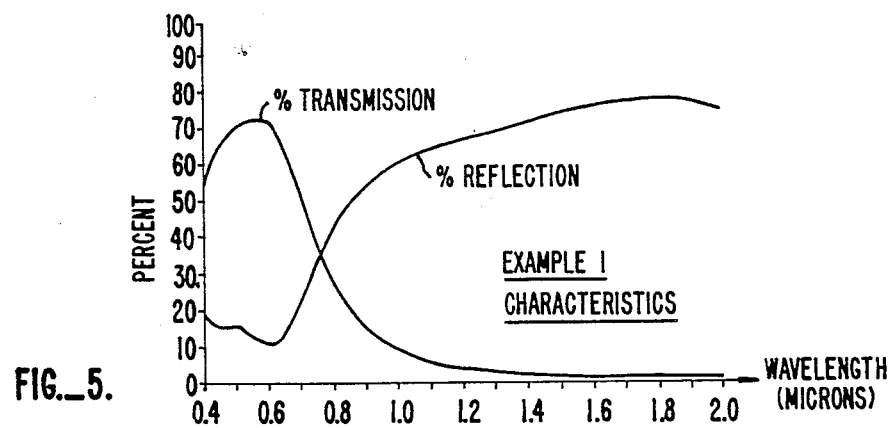
FIG._5.

SOLAR CONTROL LAYERED COATING FOR GLASS WINDOWS

Background of the Invention

This invention is related to layered coatings applied to glass windows to control the amount of solar radiation that passes through the window to heat the interior space of it, particularly to such coatings applied to vehicle glass windows in order to meet special requirements for automobile, truck and other vehicle applications.

A general goal for automobile windshields is to have a high degree of transmission over the visible range of the electromagnetic energy spectrum, while having a low amount of transmission to non-visible solar radiation, thereby reducing undesirable solar heating of the vehicle's interior. The technique most predominantly used is to tint the vehicle glass. Alternatively, an emerging technology is to provide a coating on the glass, particularly used with windshields, that utilizes several layers of material designed to reflect a significant portion of solar radiation while allowing a sufficient amount of visible light to be transmitted through it for safe operation of the vehicle. Some combined the use of a reflective coating and tinting of the glass to control its radiation transmission characteristics.

Vehicle windshield manufacturers must meet certain requirements of law. In the United States, at least seventy percent of incident radiation within a defined weighted visible portion of the electromagnetic spectrum, termed the Illuminant A spectrum, must pass through the windshield in order to provide proper visibility to the driver. The Illuminant A standard approximates the emission spectra of a tungsten lightbulb and is also similar to that of most vehicle headlights. European law requires that at least seventy-five percent of the radiation within the Illuminant A weighted spectra be passed by the windshield. This minimum visible transmission constraint affects the amount of solar radiation which can be reflected by such a coating.

An example of an existing coating is one developed by Airco Solar Products, designated the Super-H coating, for automobile windshields. This is a three-layer coating, a thin, partially transmissive layer of silver, with a layer of substantially clear zinc oxide dielectric on either side. In addition to reflecting the desired non-visible solar radiation, such commercial coated windshields reflect some visible radiation to give it some predominant color. Many of these have a strong blue or strong red color. Visible refection from such coated windshields is quantitatively measured as a percentage of the visible radiation within another weighted spectra, Illuminant C, that is reflected.

It is a principal object of the present invention to provide such a reflective coating, and window glass coated therewith, that satisfies the legal requirements for visible light transmission but which also increases the amount of reflected solar radiation while adjusting the reflected visible radiation to result in the glass appearing to be of substantially neutral color when viewed from outside the vehicle.

Summary of the Invention

This and additional objects are accomplished by the various aspects of the present invention, wherein, briefly, a glass window sheet is coated with five layers, three substantially clear dielectric layers that are separated by thin, partially reflective metallic layers. The optical thickness (actual thickness multiplied by the material's index of refraction) of the outer two dielectric layers are adjusted relative to a greater thickness of the middle dielectric layer in order to tune the coating to result in reflected visible light from solar radiation appearing to the human eye to be substantially neutral (colorless) or, at most, slightly blue. The reflected color can further be tuned by making the two partially reflective metallic layers with significantly different thicknesses. This allows the making of vehicle windshields that appear to be neutral, and which therefore better match other colors of the vehicle, while at the same time meeting the legal requirements for visible light transmission and meeting the desired goal of a high degree of reflectance of nonvisible solar radiation.

Additional objects, advantages and features of the various aspects of the present invention will become apparent from the following description of its preferred embodiments, which description should be taken in conjunction with the accompanying drawings.

Brief Description of the Drawings

FIG. 1 schematically illustrates a vehicle windshield with radiation symbols indicated;

FIG. 2 is a cross-sectional view of the windshield of FIG. 1 and which employs the various aspects of the present invention;

FIG. 3 shows the spectrum of solar radiation that is assumed when analyzing window glass characteristics;

FIG. 4 shows curves of the weighted Illuminant A and Illuminant C spectrums that are used in automobile windshield characteristic definitions;

FIG. 5 shows transmission and reflection curves of a window coated according to one specific example of the present invention; and FIG. 6 illustrates manipulation of the reflection curve of FIG. 5 by adjusting various characteristics of the coating of FIG. 2.

Description of the Preferred Embodiments

FIG. 1 illustrates generally an automobile 11 with a glass windshield 13. Incident electromagnetic radiation, indicated by an arrow 15, is partially reflected from the windshield 13, as indicated by an arrow 17, and partially transmitted through the windshield, as indicated by arrow 19. Incident radiation 15 includes, on a sunny day, a full spectrum of solar radiation, only part of which is in the visible range. It is desired, of course, to provide a windshield 13 that blocks as much as possible of the solar radiation in wavelength ranges outside of a limited visual spectrum which must be allowed to pass through with a high degree of efficiency so that the operator may safely operate the automobile.

In addition to a portion of the incident radiation 15 being reflected and another portion being transmitted through the windshield 13, yet another portion of the incident radiation is absorbed by the windshield 13 because of tinting and the like. Indeed, such tinting is currently the predominant technique for controlling the amount of radiation that is allowed to enter the automobile and thus to control and amount of undesirable solar heating of the interior of the automobile. But tinted glass absorbs solar radiation which is then re-radiated and convected to the vehicle interior, especially when there is no air flow on the outside of the car to carry away the absorbed heat. An initial reflection of solar radiation is much more desirable.

A typical windshield is formed of a laminant structure. Reflection coatings presently used on windshields are placed between two glass sheets that are laminated together. In this example, the improved five-layer coating of the present invention in shown positioned between an outer glass sheet 21 and an inner glass sheet 23 (FIG. 2). The coating is applied on the inside of the outer sheet 21. A first layer 25 of a substantially optically clear dielectric is followed by a partially reflective layer 27, generally made of an appropriate metal. A third layer 29 is again a substantially clear dielectric, followed by another partially reflective layer 31 as the fourth layer. A fifth layer 33 is also of a clear dielectric material. The individual layers 25–33 of this five-layer coating are indicated in FIG. 2 to have individual thicknesses A through E, respectively. These layers are formed on the glass 21 as a substrate by known techniques such as sputtering in large vacuum chambers, as described in published European application Ser. No. 219,273 of Bernardi et al., particularly with respect to FIG. 4 thereof.

To this five-layer coating is then applied a substantially optically clear plastic laminate layer 35 of a type commonly used in laminate glass structures, usually a polyvinylbuteral (PVB) having an index of refraction of about 1.5 and a thickness of approximately 0.76 millimeters (mm.). Each of the glass sheets 21 and 23 has a thickness of about 2.2 mm. and a refractive index of about 1.53. The laminate coating 35 used in the following specific examples is optical cement, having a thickness of about 0.15 mm. and a refractive index that is substantially the same as that of the glass sheets.

Before describing in detail the characteristics of the improved coating 25–33 according to the present invention, some basic definitions will be given with reference to the spectra illustrated in FIGS. 3 and 4. The reflected radiation 17 and transmitted radiation 19 are broken into solar ($R_{sol}$ and $T_{sol}$) and visible ($R_{via}$ and $T_{via}$) spectral range components. The intensity of the solar spectrum, as a function of radiation wavelength, is given in FIG. 3. This is the spectrum of incident light 15 on a bright, sunny day. The relative components of that incident light that are reflected ($R_{sol}$) and transmitted through the windshield 13 ($T_{sol}$) are expressed as a single number which is a percentage of the energy of the incident light 15. These numbers are determined by integrating the incident, reflected and transmitted radiation over the full solar spectrum, as indicated in FIG. 3, from 0.3 to 2.1 microns in wavelength. The more of the solar spectrum that can be blocked from entering the vehicle, the less will be the undesirable temperature rise within the vehicle due to the solar radiation. But of course, the visible light range is also within the solar spectrum, from about 0.4 to about 0.8 microns in wavelength. Therefore, the coating layers 25–33 need to allow enough of the visible light spectrum to pass through the windshield so that the automobile may be operated safely. It is desired to maximize the ratio of solar reflection $R_{sol}$ to solar transmission $T_{sol}$ in automobile and other vehicle applications.

Indeed, the United States government requires that at least 70 percent of the visible light ($T_{via}$) be allowed to pass through the windshield. The law in European countries generally requires 75 percent of the visible light to pass. In making a visible light calculation, all wavelengths within the visible region are not given the same weight, but rather are weighted according to an Illuminant A weighting, as shown by one of the curves of FIG. 4. As is well known, the visible light transmission characteristics are determined by assuming a source having a wavelength characteristic in the visible region of the Illuminant A weighting curve of FIG. 4. The Illuminant A curve is approximately the spectral output of a tungsten lightbulb and a typical automobile headlight. The proportion of that spectra, when multiplied by the non-linear response characteristic of the human eye and integrated over the visible light range, is that which is defined to be the visible light portion $T_{via}$.

Similarly, the amount of reflected visible light $R_{via}$ from the windshield 13 is calculated in a similar manner, except that a different weighting function is used, designated Illuminant C and indicated as a second curve on FIG. 4. It is generally desired to minimize the amount of visible light that is reflected from the windshield but there is necessarily some reflected light. It is the spectral composition of this reflected light that gives the windshield its apparent color. That color can be indicated quantitatively by the Hunter laboratory technique which expresses color in terms of quantities "a" and "b" along orthogonal coordinate axes.

The five-layer coating 25–33 (FIG. 2) of the present invention provides an optimal tradeoff between the competing goals of having a high visible transmission but low solar transmission through the windshield, while having a high solar reflection from the windshield with a low visible reflection of a substantially neutral color. The materials and thicknesses of each of these five layers optimizes these results. Each of the substantially clear dielectric layers 25, 29 and 33 are chosen to be of a material having an index of refraction of between 1.7 and 2.7. This includes oxides of titanium, tantalum, tin, indium, bismuth, magnesium, zirconium or zinc, or alloys of these materials. Nitrides of silicon are also appropriate. The thin, partially reflective layers 27 and 31 are preferably made from a reflective metal such as silver, palladium or platinum Each of the thicknesses A and E of the outside dielectric layers 25 and 33, respectively, are made to be substantially the same and within an optical thickness (actual thickness times the material's index of refraction) of from 600 to 1,000 Angstroms ("A"). The preferred range for the thickness of the middle dielectric 29 is from 1,700 to 2,200 Angstroms.

It has been found as part of the present invention that the reflected visible radiation $R_{via}$ may be tuned to a substantially neutral, or very slightly blue, color by controlling the relative thicknesses of several of the layers in a particular way. The substantially equal optical thicknesses A and E of the outside dielectric layers 25 and 23 are made to be within the range of from 33 percent to 45 percent of the optical thickness C of the middle dielectric layer 29. Preferably, the top end of this range is reduced to 40 percent. If the dielectric material used in each of the layers 25, 29 and 33 is the same, then the actual thicknesses of these layers will bear that relationship to each other as well. However, the dielectric materials do not need to be the same and the actual thicknesses are determined for a particular layer by first ascertaining the necessary optical thickness and then dividing that by the index of refraction of the material being used.

For windshields satisfying the United States government requirements for visible light transmission, $T_{via}$ is preferably made to fall within the range of from 70 to 73 percent. Currently, windshields usually have a much higher visible transmission and this has the disadvantage of also having a higher solar transmission. It has been found for at least the reduced visible transmission type of windshield, that the goal of obtaining a neutral reflected color is furthered by making the reflective layers 27 and 31 have unequal thicknesses B and D, respectively. One of the layers 27 or 31 is made to have a thickness within a range of from 65 to 85 percent of that of the other, and preferably less than 80 percent of it. Although good color results are obtained when either of the layers 27 or 31 is made to be the thinner one, it is preferred that the thickness D of the innermost reflective layer 31 be made thinner than the thickness B of the outermost reflective layer 27. The absolute thicknesses of the layers 27 and 31 are determined primarily by the need to meet the 70 percent visible transmission requirement since the thicker they are, the less visible light that passes through the coating.

In order to meet the European legal standards, the overall visible transmission $T_{via}$ is preferably made to fall within the range of from 75 to 77 percent. For this, one of the layers 27 or 31 is preferably made to be within the range of from 75 to 100 percent as thick as the other. If one is made to be thinner than the other, then it is preferred that the inner layer 31 be made thinner than the outer layer 27.

The optical characteristics of a windshield having the solar reflective coating according to the present invention for United States application is given in Table I below.

TABLE I

Optical Characteristics

| | |
|---|---|
| $T_{vis}$ (Ill. A) | 70 to 73 percent |
| $R_{vis}$ (Ill. C) | 11 to 14 percent |
| $T_{sol}$ | 39 to 43 percent |
| $R_{sol}$ | 36 to 38 percent |
| $R_{sol}/T_{sol}$ | 0.8 to 1.0 |
| $R_{vis}$ color (Hunter method): | |
| a = −4 to −1 | |
| b = −11 to −3 | |
| Sheet Resistance: | |
| 2.6 to 2.9 ohms per square | |

Specific thicknesses of the layers of an example coating are given in Table II below. In this example, the dielectric material for each of the layers 25, 29 and 33 was zinc oxide having a refractive index of about 2.0.

TABLE II (Example 1)

| | Actual Thickness | Optical Thickness |
|---|---|---|
| Clear Outside Glass | 2.2 mm | — |
| Dielectric Layer 25 Thickness A | 345A | 690A |
| Reflective Layer 27 Thickness B | 137A | — |
| Dielectric Layer 29 Thickness C | 940A | 1880A |
| Reflective Layer 31 Thickness D | 102A | — |
| Dielectric Layer 33 Thickness E | 350A | 700A |
| Laminate | 0.15 mm | — |
| Clear Inside Glass | 2.1 mm | — |
| $T_{vis}$ = 70.3 percent (Ill. A) | | |
| $R_{vis}$ = 12.9 percent (Ill. C) | | |
| $T_{sol}$ = 39.6 percent | | |
| $R_{sol}$ = 36.0 percent | | |
| $R_{sol}/T_{sol}$ = 0.909 | | |
| Ohms/square = 2.7 | | |
| $R_{vis}$ Color: a = −2.44 | | |
| b = −5.86 | | |

The transmission and reflection characteristics of a solar coating according to Example 1 stated above are shown in FIG. 5 as a function of radiation wavelength. It is the reflection characteristic in the visible range (radiation wavelength of about 0.4 to 0.8 microns) and enlarged approximation of the reflection curve of FIG. 5 in the visible range that is shown in FIG. 6. It will be noted that there are two minima in the FIG. 6 reflection curve, one minima 41, at about 0.46 micron wavelength, and a second minima 43 at about 0.62 micron wavelength. It has been found that the wavelength of the second minima 43 is controlled primarily by the optical thickness C of the middle dielectric layer 29. The wavelength of the minima 41 is controlled primarily by the substantially equal optical thicknesses A and E of the outside dielectric layers 25 and 33. The magnitude at the minima 41 in terms of percentage of light reflected by the structure 13 is controlled primarily by the relative thicknesses of the partially reflective layers 27 and 31, most effectively if the thickness D of the layer 31 is less than the thickness B of the layer 27.

As a second example, Table III below shows the characteristics of a windshield having a solar coating with dielectric layers 25, 29 and 33 made from titanium oxide, having a refractive index of about 2.35, and the partially reflective coatings 31 and 27 made from silver.

TABLE III (Example 2)

| | Actual Thickness | Optical Thickness |
|---|---|---|
| Clear Outside Glass | 2.2 mm | — |
| Dielectric Layer 25 Thickness A | 320A | 752A |
| Reflective Layer 27 Thickness B | 135A | — |
| Dielectric Layer 29 Thickness C | 830A | 1951A |
| Reflective Layer 31 Thickness D | 119A | — |
| Dielectric Layer 33 Thickness E | 320A | 752A |
| Laminate | 0.15 mm | — |
| Clear Inside Glass | 2.2 mm | — |
| $T_{vis}$ = 72.4 percent (Ill. A) | | |
| $R_{vis}$ = 11.5 percent (Ill. C) | | |
| $T_{sol}$ = 41.0 percent | | |
| $R_{sol}$ = 37.0 percent | | |
| $R_{sol}/T_{sol}$ = 0.902 | | |
| Ohms/square = 2.6 | | |
| $R_{vis}$ Color: a = −4.0 | | |
| b = −3.4 | | |

As a third example, Table IV shows the characteristics of a windshield made with a solar layer designed to have at least 75 percent visible transmission ($T_{via}$). The dielectric layers 25, 29 and 33 were made of zinc oxide, and the partially reflective layers 27 and 31 were made from silver.

TABLE IV (Example 3)

| | Actual Thickness | Optical Thickness |
|---|---|---|
| Clear Outside Glass | 2.2 mm | — |
| Dielectric Layer 25 Thickness A | 380A | 760A |
| Reflective Layer 27 Thickness B | 104A | — |
| Dielectric Layer 29 Thickness C | 935A | 1870A |
| Reflective Layer 31 Thickness D | 83A | — |
| Dielectric Layer 33 Thickness E | 390A | 780A |
| Laminate | 0.15 mm | — |
| Clear Inside Glass | 2.2 mm | — |
| $T_{vis}$ = 75.0 percent (Ill. A) | | |
| $R_{vis}$ = 10.0 percent (Ill. C) | | |
| $T_{sol}$ = 47.0 percent | | |
| $R_{sol}$ = 30.0 percent | | |
| $R_{sol}/T_{sol}$ = 0.638 | | |
| Ohms/square = 3.8 | | |
| $R_{vis}$ Color: a = −1.37 | | |
| b = −3.36 | | |

Although the various aspects of the invention have been described with respect to specific examples thereof, it will be understood that the invention is entitled to protection within the full scope of the appended claims.

It is claimed:

1. A solar control glass coating having a substantially neutral visible reflected color, comprising:
   a first layer of dielectric material,
   a second layer, of partially reflective metallic material,
   a third layer, of dielectric material,
   a fourth layer, of partially reflective metallic material.
   a fifth layer, of dielectric material, and
   each of said first, third and fifth dielectric layers consisting of a substantially transparent dielectric material having a refractive index within a range of from 1.7 to 2.7, said first and firth layers having substantially the same optical thickness that is substantially within a range of 33–45 percent of the optical thickness of said third layer, one of said second or fourth layers has a thickness substantially within the range of from 75 to less than 100 percent of the other of the second or fourth layer.

2. A vehicle windshield made of at least one sheet of glass with a solar control coating attached to it, wherein the entire structure has a visible transmission of from 70 to 73 percent of light incident upon it within a weighted Illuminant A weighted visible wavelength distribution and has a substantially neutral reflective visible light color, said coating comprising:
   a first layer, of dielectric material,
   a second layer, of partially reflective metallic material,
   a third layer, of dielectric material,
   a fourth layer, of partially reflective metallic material,
   a fifth layer, of dielectric material,
   each of said first, third and fifth dielectric layers being made of a substantially transparent dielectric material having a refractive index within a range of from 1.7 to 2.7, said first and fifth layers having substantially the same optical thickness that is substantially within a range of 33–45 percent of the optical thickness of said third layer, and
   said fourth layer being substantially within the range of from 65 to 85 percent of the thickness of said second layer.

3. A vehicle windshield made of at least one sheet of glass with a solar control coating attached to it, wherein the entire structure has a visible transmission of from 75 to 77 percent of light incident upon it within a weighted Illuminate A weighted visible wavelength distribution and has a substantially neutral reflective visible light color, said coating comprising:
   a first layer, of dielectric material,
   a second layer, of partially reflective metallic material,
   a third layer, of dielectric material.
   a fourth layer, of partially reflective metallic material,
   a fifth layer, of dielectric material, and
   each of said first, third and fifth dielectric layers being made of a substantially transparent dielectric material having a refractive index within a range of from 1.7 to 2.7, said first and fifth layers having substantially the same optical thickness that is substantially within a range of 33–45 percent of the optical thickness of said third layer, one of said second or fourth layers has a thickness substantially within the range of from 75 to less than 100 percent of the other second or fourth layer.

4. A laminated vehicle windshield structure, comprising:
   a first sheet of glass, forming an outside of the windshield structure,
   a solar control coating, including,
      a first layer of dielectric material,
      a second layer, of partially reflective metallic material,
      a third layer, of dielectric material,
      a fourth layer, of partially reflective metallic material,
      a fifth layer, of dielectric material,
      each of said first, third and fifth dielectric layers being made of a substantially transparent dielectric material having a refractive index within a range of from 1.7 to 2.7, said first and fifth layers having substantially the same optical thickness that is substantially within a range of 33–45 percent of the optical thickness of said third layer, and
      either of the second or fourth layers being substantially within the range of from 65 to 85 percent of the thickness of the other,
   a laminant material layer, and
   a second glass sheet forming an inside of the windshield structure.

5. A solar control glass coating having a substantially neutral visible reflected color, comprising:
   a first layer, of dielectric material,
   a second layer, of partially reflective metallic material,
   a third layer, of dielectric material,
   a fourth layer, of partially reflective metallic material,
   a fifth layer, of dielectric material, and
   each of said first, third and fifth dielectric layers consisting of a substantially transparent dielectric material having a refractive index within the range of from 1.7 to 2.7, said first and fifth layers having substantially the same optical thickness that is substantially within the range of 33–45 percent of the optical thickness of said third layer, one of said second or fourth layers has a thickness substantially within the range of from 65 to 85 percent of the other of the second or fourth layer.

6. A vehicle windshield made of at least one sheet of glass with a solar control coating attached to it, wherein the entire structure has a visible transmission of from 75 to 77 percent of light incident upon it within a weighted Illuminant A weighted visible wavelength distribution and has a substantially neutral reflective visible light color, said coating comprising:
   a first layer, of dielectric material,
   a second layer, of partially reflective metallic material,
   a third layer, of dielectric material,
   a fourth layer, of partially reflective metallic material,
   a fifth layer, of dielectric material, and
   each of said first, third and fifth dielectric layers consisting of a substantially transparent dielectric material having a refractive index within the range of from 1.7 to 2.7, said first and fifth layers having substantially the same optical thickness that is substantially within the range of 33–45 percent of the optical thickness of said third layer, one of said second or fourth layers has a thickness substantially within the range of from 65 to 85 percent of the other of the second or fourth layer.

7. The combination according to any one of claims wherein the optical thickness of the first and fifth layers is less than 40 percent of the optical thickness of said third layer.

8. The combination according to any one of claim 1-4, 5, 6, inclusive, wherein one of the second or fourth layers has a thickness that is less than substantially 80 percent of the thickness of the other.

9. The combination according to any one of claims 1-4, 5, 6, inclusive, wherein the dielectric materials of said first, third and fifth layers are selected from the group of oxides of zinc, titanium, tantalum, tin, indium, bismuth, magnesium, an alloy of any of the foregoing materials, and nitrides of silicon.

10. The combination according to any one of claims 1-4, 5, 6, inclusive, wherein the second and fourth layers are made of reflective metallic materials chosen from the group of silver, palladium, and platinum.

11. The combination according to any of claims 1-4, 5, 6, inclusive, wherein each of the first and fifth coating layers has an optical thickness lying substantially within the range of from 600 to 1,000 Angstroms and said third layer has a thickness substantially within the range of from 1700 to 2200 Angstroms.

12. The combination according to claim 1 wherein said coating is provided on a piece of glass that is part of a moving vehicle.

13. The combination according to claim 2 wherein the windshield is characterized by having a ratio of the amount of solar radiation reflected to that transmitted through the windshield being substantially within the range of 0.8 to 1.0.

14. A combination of window glass and a solar control coating, said coating comprising:
a first layer, of substantially optically transparent dielectric material,
a second layer, of partially reflective metallic material,
a third layer, of substantially optically transparent dielectric material,
a fourth layer, of partially reflective metallic material,
a fifth layer, of substantially optically transparent dielectric material, and
said first and fifth layers each having an optical thickness that is less than about forty percent of the optical thickness of said third layer, and one of said second and fourth layers having a thickness that is one of said second or fourth layers has a thickness substantially within the range of from 65 to 85 percent than that of the other of the second or fourth layer, said layer thicknesses being adjusted to result in the combination having a transmission of about seventy percent or more of light within an Illuminant A weighted visible wavelength distribution and a substantially neutral reflective visible light color.

15. A combination according to any one of claims 1-4, 15-17, inclusive, where in use the solar control coating is oriented so that the fourth layer is positioned further from the sun than the second layer and the thickness of the fourth layer is less than that of the second layer.

* * * * *